United States Patent
Lee et al.

(10) Patent No.: US 10,116,774 B2
(45) Date of Patent: Oct. 30, 2018

(54) HARDWARE PROTOCOL STACK WITH USER-DEFINED PROTOCOL APPLIED THERETO AND METHOD FOR APPLYING USER-DEFINED PROTOCOL TO HARDWARE PROTOCOL STACK

(71) Applicant: LSIS CO., LTD., Gyeonggi-do (KR)

(72) Inventors: Soo-Gang Lee, Gyeonggi-do (KR); Geon Yoon, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/388,109

(22) Filed: Dec. 22, 2016

(65) Prior Publication Data

US 2017/0310793 A1    Oct. 26, 2017

(30) Foreign Application Priority Data

Apr. 26, 2016    (KR) .................. 10-2016-0051141

(51) Int. Cl.
| | |
|---|---|
| H04J 3/16 | (2006.01) |
| H04L 29/08 | (2006.01) |
| H04L 29/06 | (2006.01) |

(52) U.S. Cl.
CPC .......... *H04L 69/324* (2013.01); *H04L 69/22* (2013.01)

(58) Field of Classification Search
CPC ...... G06F 9/30105; H04L 69/22; H04L 69/12
See application file for complete search history.

(56) References Cited

U.S. PATENT DOCUMENTS

| | | |
|---|---|---|
| 6,628,653 B1 | 9/2003 | Salim |
| 2005/0030949 A1 | 2/2005 | Shirakawa et al. |
| 2007/0067481 A1 | 3/2007 | Sharma et al. |
| 2013/0246756 A1 | 9/2013 | Lee et al. |
| 2016/0057053 A1 | 2/2016 | Ban et al. |

FOREIGN PATENT DOCUMENTS

| | | |
|---|---|---|
| JP | 2015-177263 A | 10/2015 |
| KR | 2003-0025513 A | 3/2003 |
| KR | 10-2004-0049184 A | 6/2004 |
| KR | 10-2006-0081016 A | 7/2006 |
| KR | 10-0602886 B1 | 7/2006 |
| KR | 10-2007-0081907 A | 8/2007 |
| KR | 10-2008-0016653 A | 2/2008 |

(Continued)

OTHER PUBLICATIONS

Search Report dated May 12, 2017 issued in corresponding European Application No. 16204745.0.

(Continued)

*Primary Examiner* — Melanie Jagannathan
(74) *Attorney, Agent, or Firm* — K&L Gates LLP

(57) ABSTRACT

The present disclosure relates to a hardware protocol stack, and more particularly, to a hardware protocol stack to which a user-defined protocol is applicable. The present disclosure compares header information stored in a register unit with header information of a received frame, and determines a processing of the received frame on the basis of a comparison result. Also, according to a determined frame process method, data of the received frame is processed based on a logic according to the header information, it is stored at a designated position, or a response frame is transmitted.

5 Claims, 5 Drawing Sheets

(56) References Cited

FOREIGN PATENT DOCUMENTS

KR  10-2008-0099042 A  11/2008
KR  10-2013-0104746 A   9/2013

OTHER PUBLICATIONS

Qu, et al., "High Performance and Dynamically Updatable Packet Classification Engine on FPGA", IEEE Transactions on Parallel and Distributed Systems, vol. 27, No. 1, Jan. 2016.
Anwer, et al., "SwitchBlade: A Platform for Rapid Deployment of Network Protocols on Programmable Hardware", Proceedings of the ACM Sigcomm 2010 Conference on Applications, Technologies, Architectures, and protocols for computer communications, New Delhi, India, Aug. 20-Sep. 3, 2010 pp. 183-194.
Japanese Office Action for related Japanese Application No. 2016-243606; action dated Nov. 7, 2017; (6 pages).
Pat Bosshart; "P4: Programming Protocol-Independent Packet Processors"; ACM SIGCOMM Computer Communication Review; vol. 44, No. 3; Jul. 2014; pp. 88-95).
Unknown; The P4 Language Specification, The P4 Language Consortium; Jan. 27, 2016; Version 1.1.0; pp. 1-84.
Japanese Office Action for related Japanese Application No. 2016-243606; action dated Jul. 17, 2018; (7 pages).
Kevin R. Fall, et al.; "TCP/IP Illustrated, vol. 1—The Protocols"; Addison-Wesley, 2012; Second Edition; pp. 182-183; (5 pages).

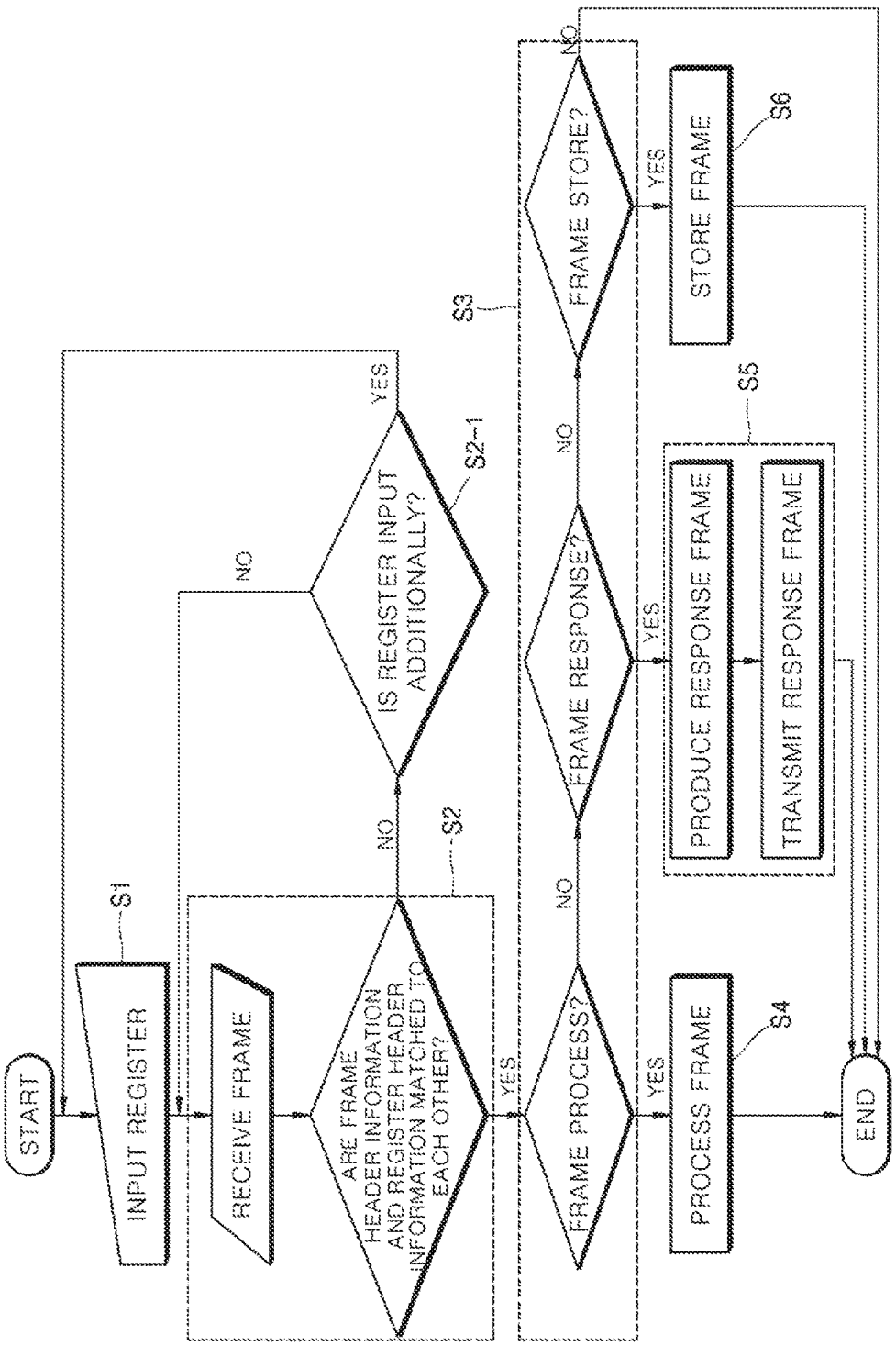

HARDWARE PROTOCOL STACK WITH USER-DEFINED PROTOCOL APPLIED THERETO AND METHOD FOR APPLYING USER-DEFINED PROTOCOL TO HARDWARE PROTOCOL STACK

CROSS REFERENCE TO RELATED APPLICATION

This application claims the benefit of Korean Patent Application No. 10-2016-0051141, fled on Apr. 26, 2016, entitled "HARDWARE PROTOCOL STACK TO APPLY USER-DEFINED PROTOCOL AND METHOD FOR. APPLY USER-DEFINED PROTOCOL OF HARDWARE PROTOCOL STACK", which is hereby incorporated by reference in its entirety into this application.

BACKGROUND

1. Technical Field

The present disclosure relates to a hardware protocol stack and a method for applying a user-defined protocol, and more particularly, to a hardware protocol stack to which a protocol defined by a user is applicable and a method for applying a user-defined protocol to the hardware protocol stack.

2. Description of the Related Art

A software protocol stack product and a hardware protocol stack product are provided with a function for automatically interpreting a protocol, and each of them processes only information related to a specific protocol. A software protocol stack ports and uses a software stack to a currently used hardware without having a separate hardware and thus there is no necessary for an additional hardware resource. However, a protocol is interpreted through software so that there is a disadvantage in which a process time is increased. Also, a hardware protocol stack is necessary for an additional hardware resource, but it has an advantage in which a process time is remarkably faster than that of the software protocol stack.

FIG. 1 is a conceptual diagram illustrating a process of extracting frame data from a software protocol stack according to the related art.

Referring to FIG. 1, in a software protocol stack 40 according to the related art, a device stores a frame 20 in a frame storage 30 when the frame 20 is input to media 10. Also, the software protocol stack 40 verifies header information of the frame 20 and determines to extract error data or the frame 20 that should be transmitted to which storage. With such a structure, when using the software protocol stack according to the related art, a developer may reduce a time necessary for development because data is automatically extracted even when the developer does not know a process in which the software protocol stack interprets a frame.

FIG. 2 is a conceptual diagram illustrating a process of extracting frame data from a hardware protocol stack according to the related art.

Referring to FIG. 2, unlike the software protocol stack, a hardware protocol stack 50 according to the related art immediately processes the frame 20 therein instead of storing the frame 20 at a frame storage when the frame 20 is input to the media 10. Therefore, a user may rapidly extract desired data.

As described above, the hardware protocol stack automatically interprets a protocol so that a development time may be reduced even when a developer does not exactly know the protocol. On the other hand, when a user-defined protocol rather than the protocol or a protocol not provided by the hardware protocol stack is processed, the developer should implement a process of interpreting a protocol in software. However, in this case, a development time or an effort is additionally necessary and performance is degraded in comparison with a protocol stack implemented in hardware.

SUMMARY

An object of the present disclosure is to provide a hardware protocol stack to which a user-defined protocol is applied and a method for applying a user-defined protocol to a hardware protocol stack, which are capable of maintaining a rapid speed of the hardware protocol stack even when a user newly defines a protocol.

The object of the present disclosure is not limited to the above described object, and other objects and advantages not mentioned above will be understood in the art from the following description and also will be apparently understood by an embodiment of the present disclosure. Also, it will be easily understood that the object and advantages of the present disclosure described herein may be implemented by means and a combination thereof defined by the appended claims.

To attain the described above object, it is provided a hardware protocol stack to which a user-defined protocol is applied, which includes a register unit in which header information is stored, a comparison unit configured to compare header information of a received frame with header information stored in the register unit whether the two header information are matched to each other, an interface logic unit configured to determine a process of the received frame on the basis of a comparison result of the comparison unit, and a logic process unit configured to process data of the received frame based on a logic according to the header information when the frame process method, which is determined in the interface logic according to the header information stored in the register unit and being matched to the header information of the received frame, is a processing of a frame.

The logic according to the header information includes a unit designation of the data according to header information. The unit designation of the data may be performed such that the logic process unit sets a basic offset and a size unit of the data when receiving a request for writing payload data in a specific region of the data and then stores payload in the basic offset by expanding the payload to be corresponded to the set size unit of the data.

Here, a frame receiving unit is included, which is configured to store the received frame in a predesignated position when the frame process method, which is determined in the interface logic unit according to header information stored in the register unit and matched to the header information of the received frame, is a storing of a frame.

Also, a frame production unit is included, which is configured to produce and transmit a response frame with respect to the received frame when the frame process method, which is determined in the interface logic unit according to header information stored in the register unit and matched to the header information of the received frame, is a transmitting of a response frame.

Further, the present disclosure provides a method for applying a user-defined protocol to a hardware protocol stack, which includes receiving an input of a register in which at least one or more frame header information is included from a user in a register unit, comparing frame header information of a received frame with at least one or more register header information in a comparison unit, and determining a frame process method on the basis of register header information matched to the at least one or more frame header information among the at least one or more register header information in an interface logic unit.

The method includes processing the received frame in a logic process unit when the frame process method, which is determined in the interface logic unit, is a processing of a frame, producing and transmitting a response frame with respect to the received frame in a frame production unit when the frame process method, which is determined in the interface logic unit, is a transmitting of a response frame, and storing the received frame at a preset destination in a frame receiving unit when the frame process method, which is determined in the interface logic unit, is a storing of a frame.

In accordance with the present disclosure, flexibility and expendability may be increased by expanding a frame interpretation function applied to only a protocol provided from a supplier of a hardware protocol stack, and by providing a function for a frame interpretation not provided by the supplied, a function for interpreting a protocol made by a user, and a calculation function.

Also, in accordance with the present disclosure, a development time may be reduced by improving an automatic interpretation function fixed to kinds of protocols in a hardware protocol stack to automatically process a protocol defined by a user in hardware, and a rapid speed may be maintained because a frame is interpreted in hardware even when the user defines a protocol.

BRIEF DESCRIPTION OF DRAWINGS

FIG. 5 is a flow chart of a method for applying a user-defined protocol of a hardware protocol stack according to the present disclosure.

DETAILED DESCRIPTION

Figure 1:
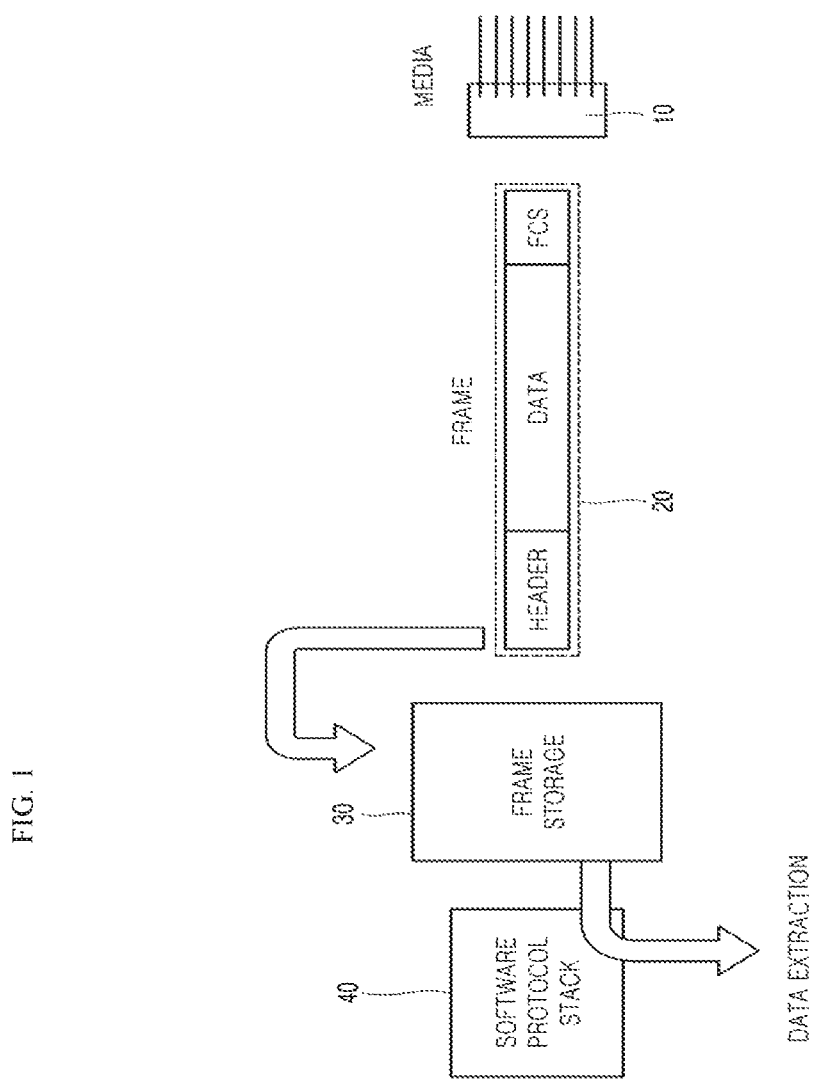
FIG. 1 is a conceptual diagram illustrating a process of extracting frame data from a software protocol stack according to the related art.
Figure 2:
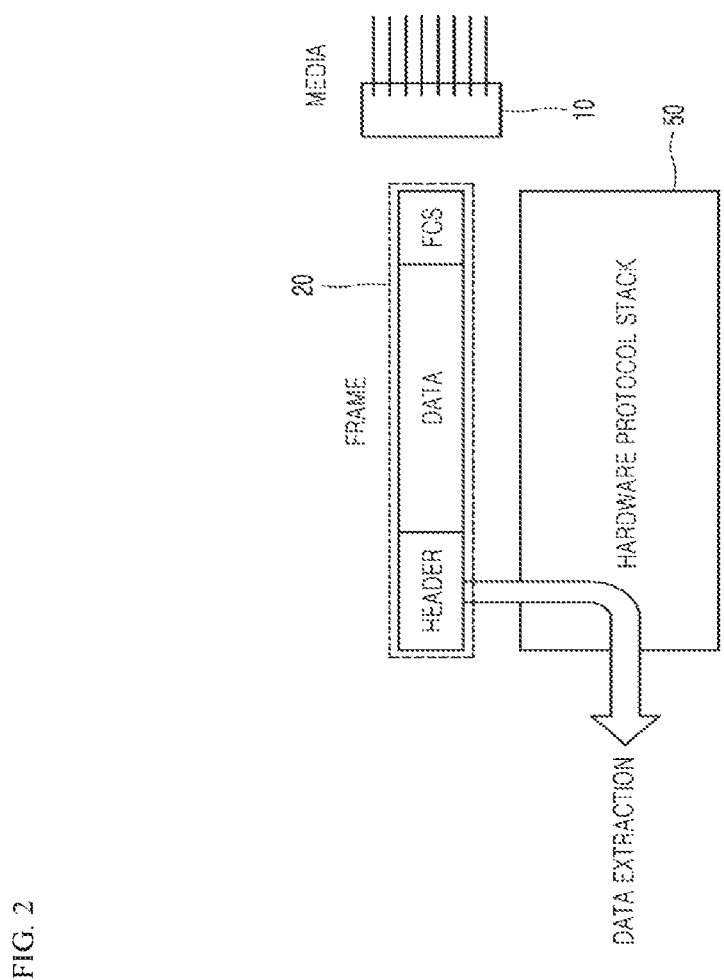
FIG. 2 is a conceptual diagram illustrating a process of extracting frame data from a hardware protocol stack according to the related art.

The above and other objects, features and advantages of the present disclosure will be described later in detail with reference to the accompanying drawings, and thus the technical spirit of the present disclosure can be easily implemented by those skilled in the art. In the following description of the present disclosure, if a detailed description of known configurations and functions is determined to obscure the interpretation of embodiments of the present disclosure, the detailed description thereof will be omitted. Hereinafter, preferred embodiments according to the present disclosure will be described in detail with reference to the accompanying drawings. In the drawings, the same reference numerals refer to the same or similar elements throughout.

Figure 3:
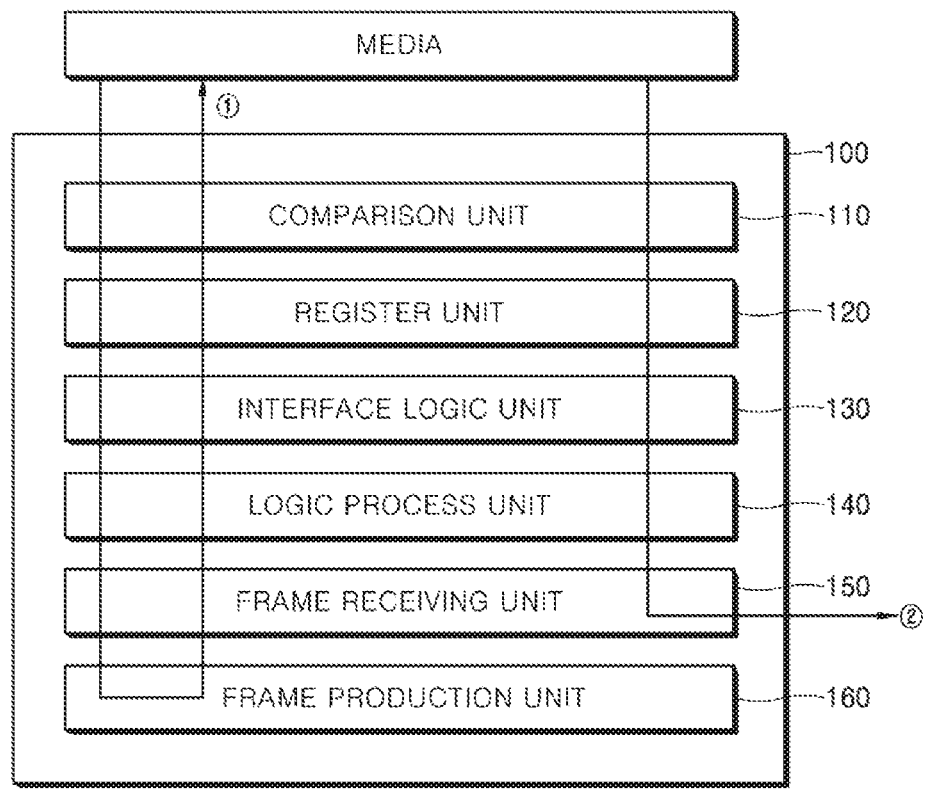
FIGS. 3 and 4 are block diagrams of a hardware protocol stack to which a user-defined protocol is applied according to the present disclosure, respectively.
Figure 4:
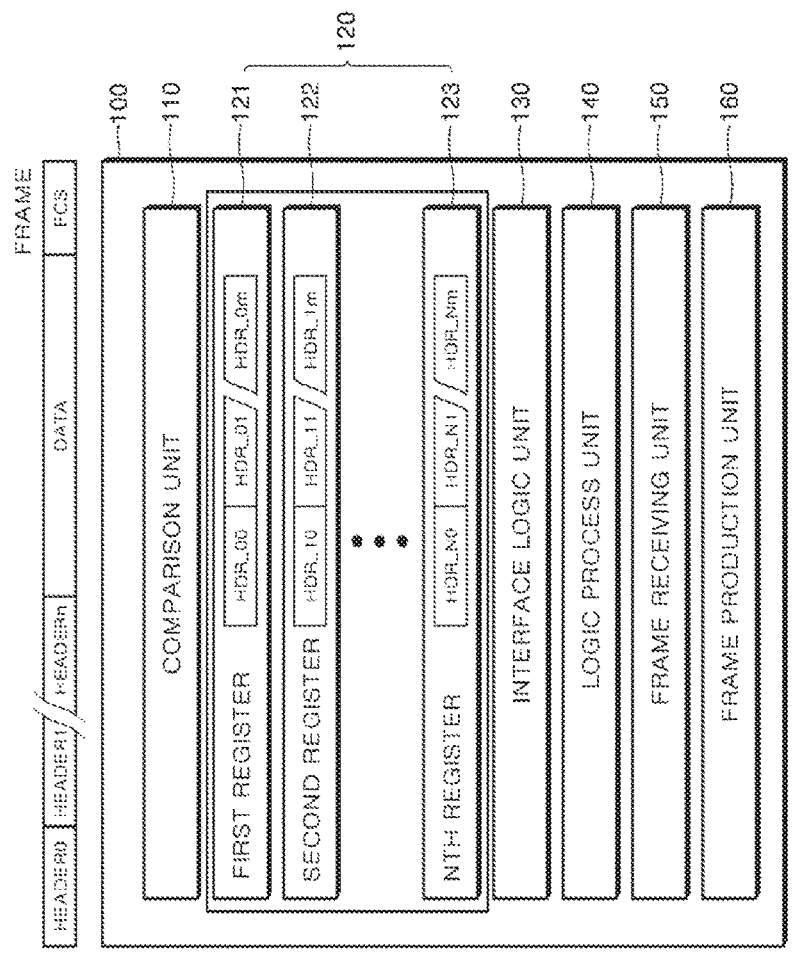

FIGS. 3 and 4 are block diagrams of a hardware protocol stack to which a user-defined protocol is applied according to the present disclosure, respectively.

As shown in FIGS. 3 and 4, a hardware protocol stack to which a user-defined protocol is applied according to the present disclosure includes a comparison unit 110 for comparing a header of a received frame with a header stored in a register, a register unit 120 for storing a header, an interface logic unit 130 determining a process of a received frame, a logic process unit 140 for processing data of a received frame according to a logic, a frame receiving unit 150 for receiving and storing a frame, and a frame production unit 160 for generating a frame.

The comparison unit 110 compares header information of a frame received from media, that is, frame header information with header information stored in the register unit 120, that is, register header information. Generally, the frame is configured with header information, that is, frame header information, data, and a frame check sequence (FCS). The comparison unit 110 compares the frame header information among the frame header information, the data, and the FCS with the register header information whether they are the same as each other.

The register unit 120 stores header information of a protocol that is an analysis target. A user may store header information of a protocol, which is not used in a commercial stack product or is defined by the user so as to develop a product, in a register. Such a register unit 120 may include a plurality of registers. The present disclosure exemplifies that the register unit 120 includes a first register 121, a second register 122, and an $N^{th}$ register 123. Here, the first register 121 includes in number of register header information (m is a natural number), and this exemplifies HDR_00, HDR_01, ..., HDR_0m. The second register 122 also includes m number of register header information (m is a natural number), this exemplifies HDR_10, HDR_11, ..., HDR_1m. Also, the $N^{th}$ register 123 (N is a natural number) includes in number of register header information (m is a natural number), this exemplifies HDR_N0, HDR_N1, ..., HDR_Nm.

When the m number of register header information (m is a natural number) included in a frame are exemplified as HDR_R0, HDR_R1, HDR_Rm, the comparison unit 110 compares HDR_00, HDR_01, ..., HDR_0m, which are the register header information included in the first register 121, with HDR_R0, HDR_R1, ..., , HDR_Rm, which are the frame header information included in the frame. Here, when the two header information (that is, the frame header information and the register header information) are not matched to each other, the comparison unit 110 compares HDR_10, HDR_11, ..., HDR_1m, which are the register header information included in the second register 122, with HDR_R0, HDR_R1, ..., HDR_Rm, which are the frame header information included in the frame. When the frame header information and the register header information included in the second register 122 are matched to each other, the header information comparison is terminated. On the other hand, when the frame header information and the register header information included in the second register 122 are not matched to each other, register header information included in a third register that is a next register is compared with the frame header information. Also, the comparison unit 110 performs the comparison operation unit the frame header information and the register header information are matched to each other, and such a comparison operation may be performed up to the $N^{th}$ register 123. However, the present disclosure is not limited thereto, and the frame header information and all the register header information may be simultaneously compared with each other as necessary.

The interface logic unit 130 determines whether the frame header information of the received frame is compared with the register header information stored in the register unit 120, a comparison range of the frame header information and the register header information, and whether the received frame is stored. That is, the interface logic unit 130 differently performs a frame process method on a frame according to a kind of a header included therein. Here, the frame process method includes a processing or storing of the frame and a producing and transmitting of a response frame.

When the frame header information of the frame and the register header information are matched to each other and the frame process method of the interface logic unit 130 with respect to corresponding frame header information is a processing of a frame, the logic process unit 140 processes data of the received frame according to a logic. Here, the logic is a rule according to the frame header information, and, for example, it may include a unit designation of frame data according to the frame header information, and the like. In the unit designation of the frame data, a unit is not designated in the data included in the received frame. Therefore, the logic process unit 140 designates a unit in data according to header information of a corresponding frame.

For example, referring to Table 1, when a request for writing payload data in a size of 0×20 at a 0×10 region is received, a user may use the logic process unit 140 to have expandability capable of setting a basic offset to 0×1000 and a size unit to 4 bytes and storing payload at 0×1010 as much as 0×80.

TABLE 1

| Before applying logic process unit | Source: payload, Destination: 0 × 10, Size: 0 × 20 |
| After applying logic process unit | Source: payload, Destination: 0 × 10 + 0 × 1000. Size: (0 × 20)*4 |

When the frame header information and the register header information are matched to each other and a frame process method of the interface logic unit 130 with respect to a corresponding frame header information is a frame storing, the frame receiving unit 150 stores a corresponding frame at a preset position, that is, processes along a path ② in FIG. 3.

When the frame header information and the register header information are matched to each other and a frame process method of the interface logic unit 130 with respect to the corresponding frame header information is a response frame transmitting, the frame production unit 160 produces and transmits a response frame, that is, processes along a path ① in FIG. 3. Here, the frame production unit 160 may produce not only the response frame but also various frames designated according to the frame header information.

Next, a method for applying a user-defined protocol of a hardware protocol stack according to the present disclosure will be described with reference to the drawings. In the following description, contents, which are overlapped with the above described hardware protocol stack to which the user-defined protocol according to the present disclosure is applied, will be omitted or described in brief.

FIG. 5 is a flow chart of a method for applying a user-defined protocol of a hardware protocol stack according to the present disclosure.

As shown in FIG. 5, the method for applying a user-defined protocol of a hardware protocol stack includes receiving an input of a register in Operation S1, comparing header information in Operation S2, determining a frame process in Operation S3, processing a frame in Operation S4, responding with the frame in Operation S5, and storing the frame S6.

The register unit receives an input of a register from a user in Operation S1. The register unit stores the received register input by the user so as to compare the received register with frame header information of a frame that will be received later. Also, the received register input by the user includes header information, that is, register header information.

When a frame is received in Operation S2, the comparison unit compares the register header information of the received register input in Operation S1 with frame header information of the received frame. Here, the register unit includes a first register to an $N^{th}$ register. Also, the comparison unit compares the frame header information with register header information of each of the first register to the $N^{th}$ register until the two hear information are matched to each other.

Meanwhile, when the frame header information and the register header information are matched to each other in Operation S2, the present disclosure may further include receiving additionally an input of a register from the user in Operation S2-1.

When the register header information matched to the frame header information exists in Operation S2, the interface logic unit processes the frame with a frame process method according to the corresponding register header information in Operation S3. Here, the frame process method includes a processing or storing of the frame and a producing and transmitting of a response frame as described above.

When the frame process method according to the header information is a processing of a frame in Operation S3, the logic process unit processes the received frame in Operation S4.

On the other hand, when the frame process method according to the header information is a responding with a frame, that is, a transmitting a response frame in Operation S3, the frame production unit produces and transmits a response frame in Operation S5.

Further, when the frame process method according to the header information is a storing of a frame in Operation S3, the frame receiving unit stored the received frame at a destination in Operation S6.

Although the present disclosure has been described with reference to the embodiments, it should be understood that numerous other substitutions, modifications and alterations can be devised by those skilled in the art without departing the technical spirit of this disclosure, and thus it should be construed that the present disclosure is not limited by the embodiments described above and the accompanying drawings.

What is claimed is:

1. A hardware protocol stack to which a user-defined protocol is applied, comprising:
   a register unit in which header information is stored;
   a comparison unit configured to compare header information of a received frame with the header information stored in the register unit to determine whether the header information is matched to the other;

an interface logic unit configured to determine a process of the received frame on the basis of a comparison result of the comparison unit; and a logic process unit configured to process data of the received frame based on a logic according to the header information when the frame process method, which is determined in the interface logic according to the header information stored in the register unit and being matched to the header information of the received frame, is a processing of a frame, wherein the logic according to the header information includes a unit designation of the data according to the header information;

wherein the unit designation of the data is performed such that the logic process unit sets a basic offset and a size unit of the data when receiving a request for writing payload data in a specific region of the data and then stores payload in the basic offset by expanding the payload to be corresponded to the set size unit of the data.

2. The hardware protocol stack of claim 1, further comprising:

a frame receiving unit configured to store the received frame in a predesignated position when the frame process method, which is determined in the interface logic unit according to the header information stored in the register unit and matched to the header information of the received frame, is a storing of a frame.

3. The hardware protocol stack of claim 1, further comprising:

a frame production unit configured to produce and transmit a response frame with respect to the received frame when the frame process method, which is determined in the interface logic unit according to the header information stored in the register unit and matched to the header information of the received frame, is a transmitting of a response frame.

4. A method for applying a user-defined protocol to a hardware protocol stack, comprising:

receiving an input of a register in which at least one or more frame header information is included from a user in a register unit;

comparing frame header information of a received frame with at least one or more register header information in a comparison unit;

determining a frame process method on the basis of register header information matched to the at least one or more frame header information among the at least one or more register header information in an interface logic unit; and processing, by a logic process unit, data of the received frame based on a logic according to the header information when the frame process method, which is determined in the interface logic unit, is a processing of a frame, wherein the logic according to the header information includes a unit designation of the data according to the header information, wherein the unit designation of the data is performed such that the logic process unit sets a basic offset and a size unit of the data when receiving a request for writing payload data in a specific region of the data and then stores payload in the basic offset by expanding the payload to be corresponded to the set size unit of the data.

5. The method of claim 4, further comprising:

producing and transmitting a response frame with respect to the received frame in a frame production unit when the frame process method, which is determined in the interface logic unit, is a transmitting of a response frame; and storing the received frame at a preset destination in a frame receiving unit when the frame process method, which is determined in the interface logic unit, is a storing of a frame.

* * * * *